J. E. Wootten,
Rivet,

Nº 67,624.    Patented Aug. 6, 1867.

Witnesses.
Wm Albert Steel
John Parker

Inventor
J. E. Wootten
By his Atty
H. Howson

United States Patent Office.

JOHN E. WOOTTEN, OF CRESSONA, PENNSYLVANIA.

Letters Patent No. 67,624, dated August 6, 1867.

IMPROVEMENT IN RIVET.

The Schedule referred to in these Letters Patent and making part of the same.

TO ALL WHOM IT MAY CONCERN:

Be it known that I, JOHN E. WOOTTEN, of Cressona, Schuylkill county, Pennsylvania, have invented an improved Rivet; and I do hereby declare the following to be a full, clear, and exact description of the same reference being had to the accompanying drawing, and to the letters of reference marked thereon.

My invention consists of a tubular rivet made by coiling a strip of flat bar or plate iron, and then welding the same, as described hereafter, a rivet thus constructed being especially applicable to the securing of rail-splices and other objects on railways which have heretofore been fastened by solid rivets which had to be heated, and to use which demanded cumbrous appliances, dispensed with in using my improved tubular rivet, the latter being fastened without any preliminary heating.

My invention further consists in so making the rivet that the grain of the iron shall take a transverse course at right angles or thereabouts to the axis of the rivet.

In order to enable others to make and use my invention, I will now proceed to describe its construction and operation, reference being had to the accompanying drawing, which forms a part of this specification, and in which—

Figures 1, 2:
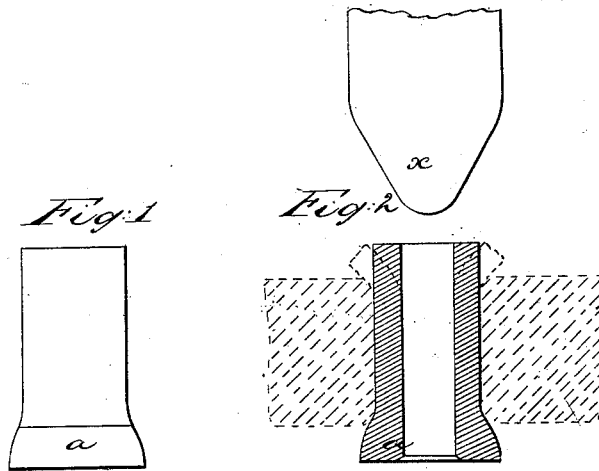

Figure 1 is an exterior view of my improved rivet.

Figure 2 a sectional view, and

Figure 3:
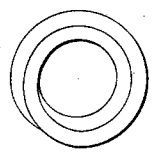
Figure 4:
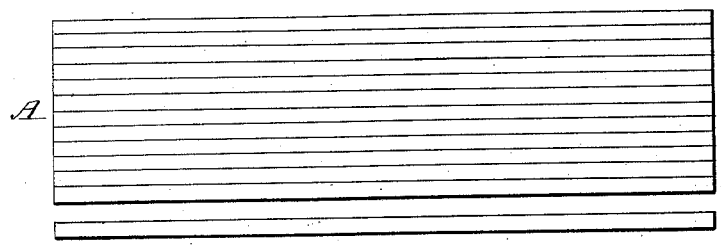

Figures 3 and 4 diagrams illustrating the mode of manufacturing the improved rivets.

The rivets are made of ordinary flat bar or plate iron, a strip, A, fig. 4, of which is cut to the desired length, its ends tapered off, and the strip then made into a coil, as seen in fig. 3, and the coil is then welded and a head formed at one end, $a$, so as to form the rivet illustrated in figs. 1 and 2.

Although my improved rivet may be used to advantage in numerous cases, it is especially applicable to the securing of rail-splices, chairs, and other objects on railways, to fasten which it has been customary to employ heated rivets. In using the tubular rivet, all that is necessary is to introduce it to its place from below, as seen in fig. 2, and for one workman to force the head $a$ with a suitable bar against the object to be riveted, while another workman introduces the point of a punch, $x$, into the hole in the rivet at the top of the same, and strikes the punch several smart blows with a hammer, thereby expanding the end of the rivet, as shown by dotted lines, fig. 2. In making the rivet, it is preferable for the grain of the iron to be in the direction of the lines shown on the strip A, fig. 4; in other words, that the grain of the iron in the rivet should be transverse, and not parallel with the axis of the rivet, otherwise the end, on being expanded in the manner described, would be apt to split, whereas a perfectly sound and unbroken expanded end may be formed if the grain of the iron be in the direction indicated.

I claim as my invention, and desire to secure by Letters Patent—

1. A tubular rivet made by coiling a strip of iron, and then welding the same, as set forth.

2. A tubular rivet in which the grain of the iron takes a transverse course at right angles, or thereabouts, to the axis of the rivet, as described for the purpose specified.

In testimony whereof I have signed my name to this specification in the presence of two subscribing witnesses.

J. E. WOOTTEN.

Witnesses:
HENRY HOWSON,
W. J. R. DELANY.